United States Patent [19]

Satoh et al.

[11] Patent Number: 5,005,859

[45] Date of Patent: Apr. 9, 1991

[54] MOTOR VEHICLE SUSPENSION WITH ROTARY DAMPER

[75] Inventors: Yutaka Satoh; Yoshinori Takeuchi, both of Shizuoka, Japan

[73] Assignee: Kabushiki Kaisha Showa Seisakusho, Tokyo, Japan

[21] Appl. No.: 438,681

[22] Filed: Nov. 17, 1989

[30] Foreign Application Priority Data

Nov. 18, 1988 [JP] Japan .................. 63-291985
Nov. 18, 1988 [JP] Japan .................. 63-291986
Apr. 25, 1989 [JP] Japan .................. 1-105680

[51] Int. Cl.$^5$ .............................. B60G 15/06
[52] U.S. Cl. .................. 280/721; 188/130; 267/259; 280/700; 280/709; 280/672
[58] Field of Search .......... 280/701, 690, 688, 675, 280/674, 702, 700, 709, 716, 672; 267/259, 284; 188/130

[56] References Cited

U.S. PATENT DOCUMENTS 4,530,513 7/1985 Kijima et al. .................. 280/690
4,530,514 7/1985 Ito ................................ 280/690
4,722,544 2/1988 Weber ........................... 280/690

FOREIGN PATENT DOCUMENTS 56-28008  3/1981 Japan .
58-90810  6/1983 Japan .
58-55923 12/1983 Japan .
59-11766  4/1984 Japan .

*Primary Examiner*—Richard A. Bertsch
*Attorney, Agent, or Firm*—Merchant, Gould, Smith, Edell, Welter & Schmidt

[57] ABSTRACT

A suspension for supporting a wheel on a vehicle body includes a hollow shaft fixed to the vehicle body, an arm having one end coupled to the wheel and an opposite end pivotally supported on an outer peripheral surface of the hollow shaft, a rotary damper interposed between the hollow shaft and the arm, for dampening swinging movement of the arm with respect to the hollow shaft, and a torsion bar extending through the hollow shaft and having one end fixed to the vehicle body and an opposite end coupled to the opposite end of the arm for angular movement in unison with the arm.

7 Claims, 5 Drawing Sheets

MOTOR VEHICLE SUSPENSION WITH ROTARY DAMPER

BACKGROUND OF THE INVENTION

1. Field of the Invention

The present invention relates to a motor vehicle suspension having a rotary damper, and more particularly to a suspension suitable for use as a rear wheel suspension for a four-wheeled motor vehicle.

2. Description of the Relevant Art

One prior motor vehicle suspension having a rotary damper is known from Japanese Laid-Open Patent Publication No. 56(1981)-28008, for example. The disclosed motor vehicle suspension includes a casing fixed to the frame of a motorcycle and having a cylindrical oil chamber defined therein. The oil chamber accommodates therein a rotor angularly movable with a swing arm and having vane slidably held against the inner peripheral wall surface of the oil chamber.

Japanese Laid-Open Utility Model Publication No. 58(1983)-90810 discloses a rear wheel suspension for a motor vehicle. The suspension has a rotary damper including a hollow rotor through which a torsion bar extends. One end of the torsion bar is coupled to an arm integral with the hollow rotor. Alternatively, the damper case and rotor of a rotary damper are disposed in a hollow torsion tube, and the proximal end of an arm is attached to an outer peripheral surface of the torsion tube.

Generally, a suspension for a four-wheeled motor vehicle is disposed in a limited space within a tire housing, and is required to effectively dampen relative movement of the tire and the vehicle body. A suspension having a rotary damper is more advantageous than a conventional strut-type suspension in that it takes up a smaller installation space, i.e., it is a space saver.

With the conventional rotary dampers, however, the damper case is fixed to the motor vehicle body and the rotor and the vane are angularly moved with the arm. The rotary dampers are constructed of many components and complex in structure. Since the oil chamber is cylindrical in shape, the damper case is large in size and needs an extra space for installation.

Inasmuch as the arm is directly coupled to the torsion tube, vertical and fore-and-aft bending forces tend to be applied to the torsion tube through the arm. The area through which the arm is supported, i.e., the area through which the torsion tube and the arm are attached to each other, cannot be increased. Consequently, a reinforcing structure for the arm is complex.

SUMMARY OF THE INVENTION

According to the present invention, an arm is swingably mounted on a hollow shaft fixed to a vehicle body and a rotary damper is interposed between the hollow shaft and the arm. A torsion bar extending through the hollow shaft and has an end fixed to the vehicle body and an opposite end coupled to the arm.

The torsion bar functions like a coil spring, and the rotary damper produces a damping force. Since the rotary damper is interposed between the arm and the hollow shaft and the torsion bar extends through the hollow shaft, the suspension of the invention is simple in structure and takes up a reduced space in vertical and fore-and-aft directions. As the suspension is compact in size, passenger and engine compartments may be increased in size.

According to an embodiment of the invention, the arm comprises two arms joined to each other and swingably mounted on the hollow shaft, and the rotary damper includes a damper case comprising a housing disposed between the two arms whose ends close opposite sides of said housing.

The rotary damper has an oil chamber of a noncylindrical shape which may be displaced in one direction. As a result, the damper case may be reduced in size.

According to another embodiment, the opposite sides of the housing are closed by a pair of end plates, respectively, which are angularly movably mounted on the hollow shaft, and an arm having an axle insertion hole defined in a distal end thereof is integrally formed with or joined to the housing.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
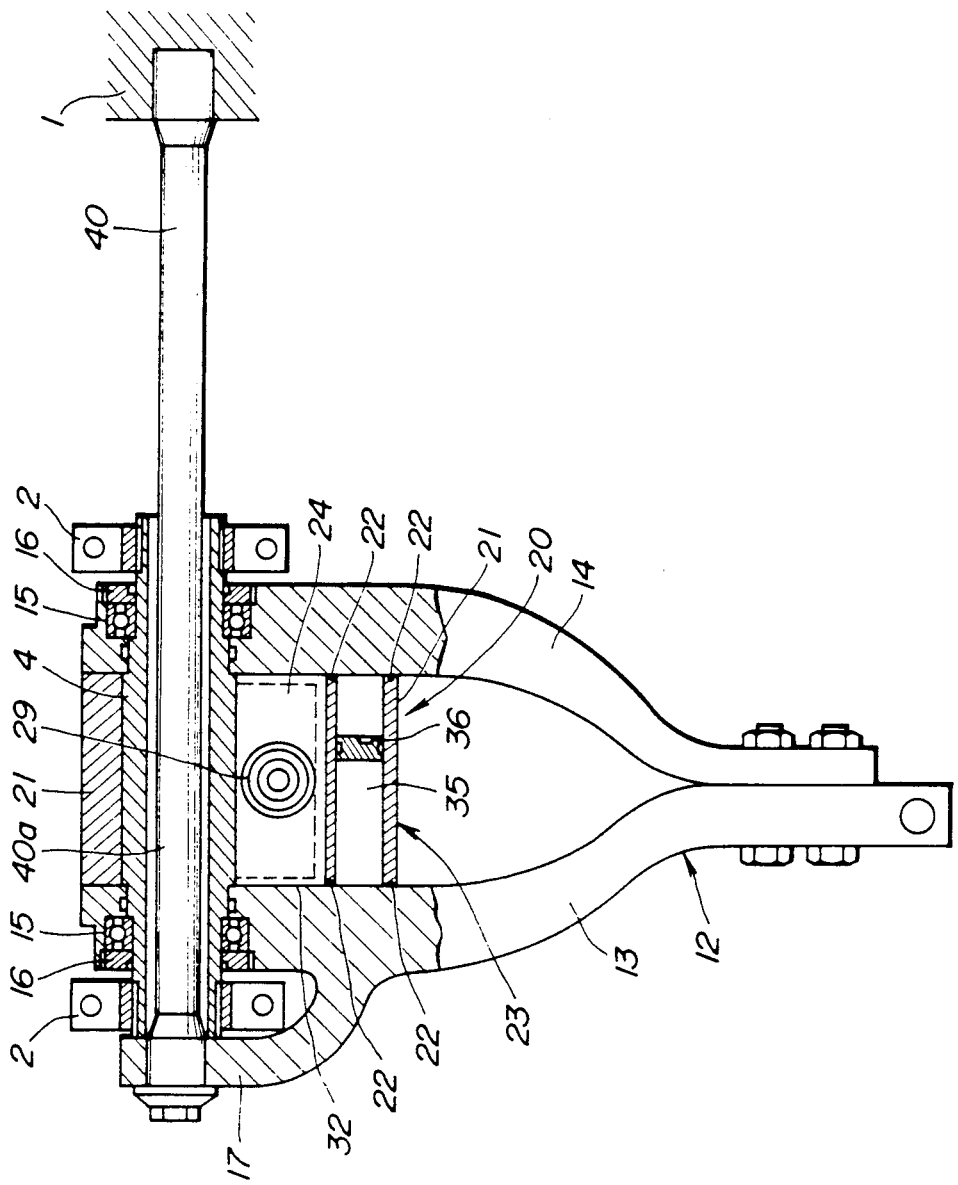
FIG. 1 is a horizontal cross-sectional view of a motor vehicle suspension having a rotary damper according to an embodiment of the present invention.
Figure 2:
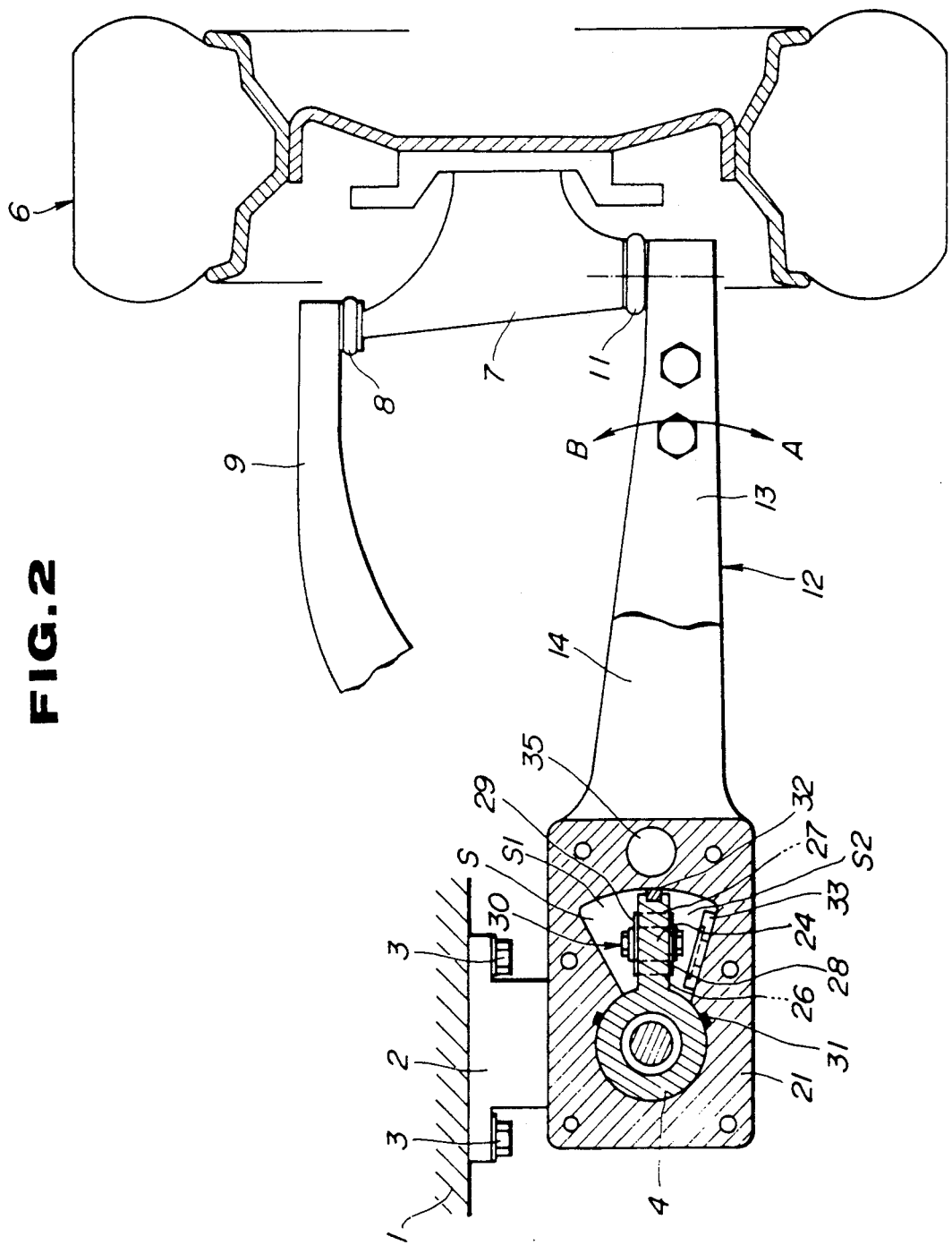
FIG. 2 is a vertical cross-sectional view of the motor vehicle suspension shown in FIG. 1.

As shown in FIG. 1, a hollow shaft 4 has its opposite ends supported by brackets 2 which are fixed to a vehicle body 1 by bolts 3 (FIG. 2).

A lower arm 12 comprises first and second arms 13, 14 spreading progressively away from each other and having proximal ends pivotally supported on the hollow shaft 4 by respective bearings 15. Therefore, the lower arm 12 is swingably mounted on the vehicle body 1. A subarm 17 is integrally formed with on side of the supported end of the first arm 13. Ducts cases 16 are threaded in the arms 13, 14, respectively, and positioned outwardly of the respective bearings 15.

A torsion bar 40 extends through the hollow shaft 4 and has one end fixed to the vehicle body 1 and the opposite end coupled to the subarm 17 by serrations or splines. Accordingly, the lower arm 12 is resiliently supported by the torsion bar 40.

As shown in FIG. 2, the distal end of the lower arm 12 which is remote from the hollow shaft 4 is coupled by a pillow ball joint 11 to the lower end of a knuckle 7 by which a wheel 6 with a tire mounted thereon is rotatably supported. An upper arm 9 which is swingably attached to the vehicle body 1 has an outer end joined to the upper end of the knuckle 7 by a pillow ball joint 8.

As shown n FIG. 1, a rotary damper 20 is interposed between the hollow shaft 4 and the pivotally supported ends of the arms 13, 14. The rotary damper 20 comprises a damper case 23 having an oil chamber S defined therein and a vane 24 disposed in the oil chamber S. The oil chamber S is filled with working oil.

A housing 21 is positioned between and interconnects the pivotally supported ends of the arms 13, 14. When the lower arm 12 swings, the housing 21 also swings with the lower arm 12 relatively to the hollow shaft 4.

As illustrated in FIG. 2, the housing 21 has a noncylindrical hole defined therein and extending between the opposite sides of the housing 21. The noncylindrical hole has a sectorial cross-sectional shape which spreads toward the end of the lower arm 12 which is connected to the knuckle 7. The opposite sides of the housing 21 are fixed to the pivotally supported ends of the arms 13, 14 through respective O-rings 22 (FIG. 1). Therefore, the noncylindrical hole is closed by the arms 13, 14, and serves as the oil chamber S. The pivotally supported ends 13, 14 and the housing 21 jointly constitute the damper case 23 of the rotary damper 20.

The vane 24 is integrally formed with the outer peripheral surface of the hollow shaft 4. The vane 24 disposed in the oil chamber S divides the oil chamber S into upper and lower oil chambers S1, S2. The vane 24 has oil passages 26, 27 defined therein and communicating between the two oil chambers S1, S2. A valve 30 mounted on the vane 24 has valve plates 28, 29 disposed on the opposite sides of the vane 24 for opening and closing the oil passages 26, 27.

Seal members 31 are mounted in the surface of the housing 21 against which the hollow shaft 4 is slidable. The seal members 31 seal a gap between the housing 21 and the outer peripheral surface of the hollow shaft 4. Another seal member 32 for sealing a gap between the peripheral surface of the vane 24 and the inner surface of the housing 21 is attached to the peripheral surface of the vane 24. A rebound rubber member 33 is attached to the lower wall surface of the oil chamber S2.

As shown in FIG. 1, the housing 21 also has a temperature compensation chamber 35 defined therein and communicating with the oil chamber S through an oil passage (not shown). Any temperature-dependent change in the volume of working oil used in the rotary damper 20 is absorbed by a free piston 36 that is slidably fitted in the temperature compensation chamber 35.

The motor vehicle suspension thus constructed as shown in FIGS. 1 and 2 operates as follows:

When the wheel 6 moved vertically with respect to the vehicle body 1 depending on the road condition while the motor vehicle is running, the lower arm 12 is caused to swing in the directions indicated by the arrows A, B about the hollow shaft 4. The torsion bar 40 is resiliently twisted to dampen the swinging movement of the lower arm 12.

At the same time, the swinging movement of the lower arm 12 is also dampened by the rotary damper 20. If the lower arm 12 swings from the position shown in FIG. 2 in the direction indicated by the arrow A, then the vane 24 integral with the hollow shaft 4 is caused to swing upwardly within the oil chamber S relatively to the housing 21. The working oil in the upper oil chamber S1 flows through the oil passage 26 into the lower oil chamber S2 while opening the valve plate 28, thereby producing a damping force to dampen the swinging movement of the lower arm 12. If the lower arm 12 swings from the position of FIG. 2 in the direction indicated by the arrow B, then the vane 24 is caused to swing downwardly within the oil chamber S, forcing the working oil to flow from the lower oil chamber S2 through the oil passage 27 into the upper oil chamber S1 while opening the valve plate 29 thereby to dampen the swinging movement of the lower arm 12.

As described above, the lower arm 12 is composed of the two arms 13, 14 at one end thereof, and the housing 21 is disposed between the arms 13, 14 whose ends serve as end plates that close the opposite sides of the housing 21. No separate end plates are needed to close the opposite sides of the housing 21, and the end of the lower arm 12 and the damper case 23 of the rotary damper 20 are combined as a unitary assembly. Therefore, the end of the lower arm 12 is increased in rigidity, and a large oil chamber can be defined in the housing 21. Since thrust loads applied in the fore-and-aft directions when the motor vehicle moves forwards or backwards are borne separately by the two arms 13, 14, they can withstand large thrust loads applied in the fore-and-aft directions.

The damper case 23 may be reduced in size since the oil chamber S of the rotary damper 20 is noncylindrical in shape and displaced toward the wheel 6.

While the rotary damper 20 is shown as being positioned at the pivotally supported end of the lower arm 12, it may be positioned at the pivotally supported end of the upper arm 9.

Figure 3:
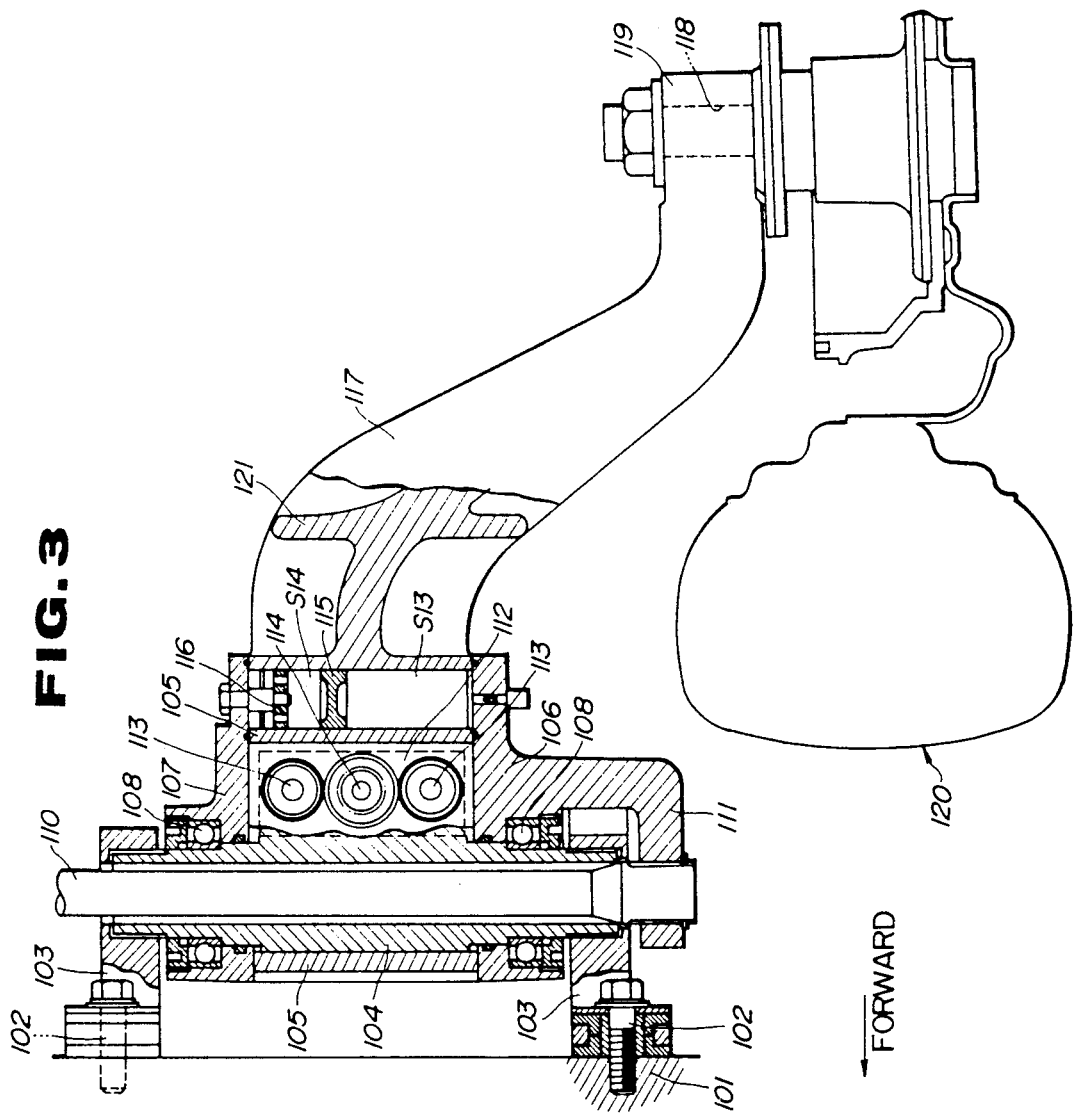
FIG. 3 is a horizontal cross-sectional view of a motor vehicle suspension according to another embodiment of the present invention.
Figure 4:
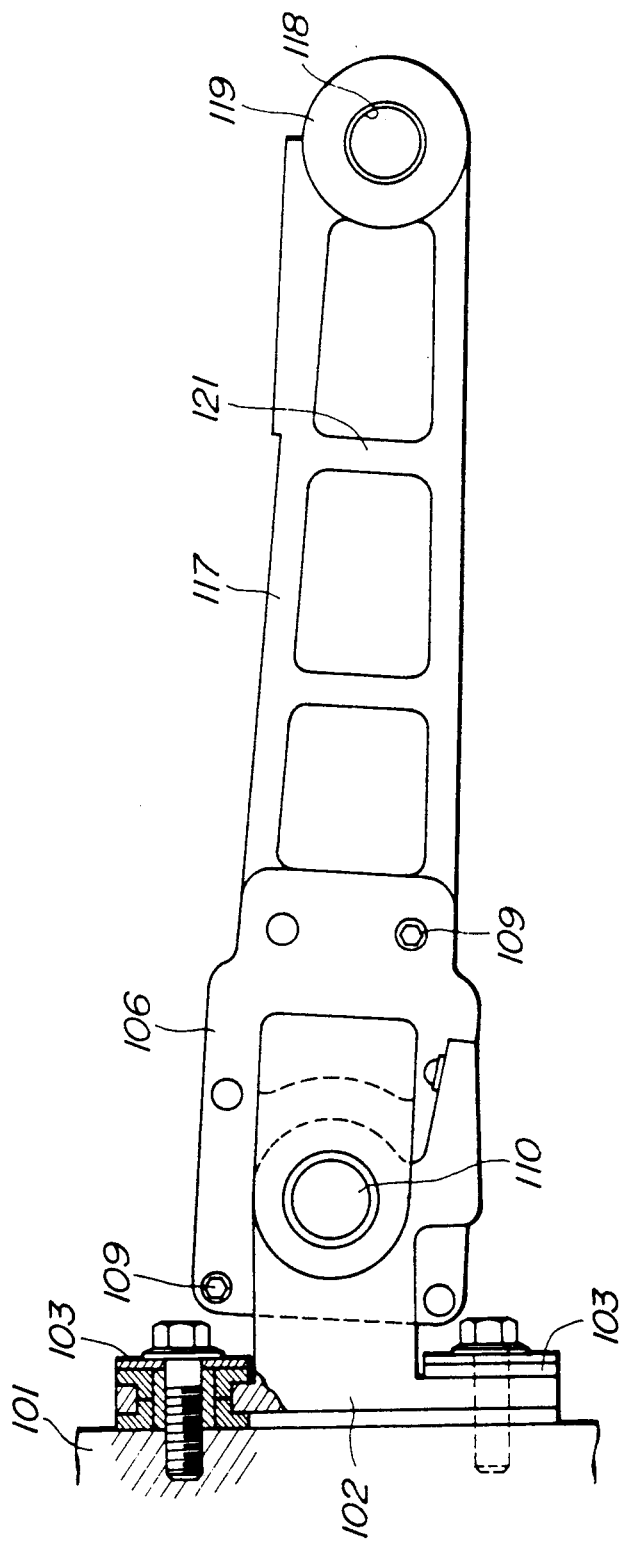
FIG. 4 is a side elevational view of the motor vehicle suspension shown in FIG. 3.
Figure 5:
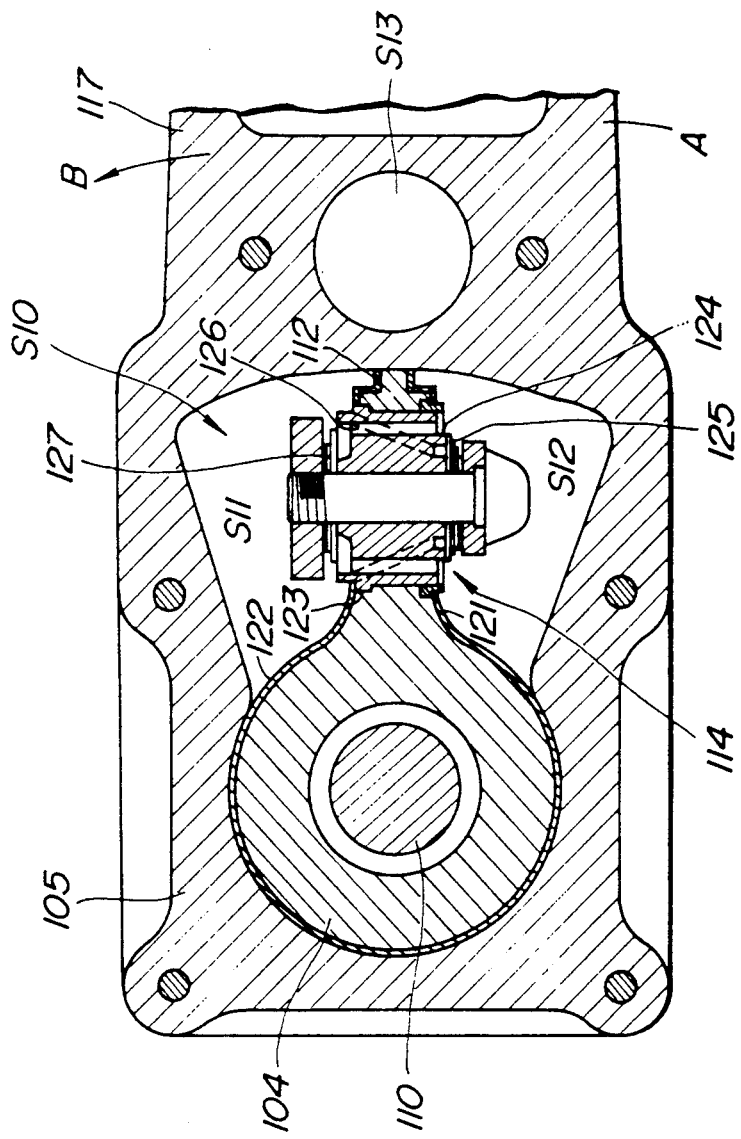
FIG. 5 is a vertical cross-sectional view of the motor vehicle suspension illustrated in FIG. 3.

FIGS. 3 through 5 show a motor vehicle suspension according to another embodiment of the present invention.

As shown in FIG. 3, a hollow shaft 4 has opposite ends supported by brackets 102 fixed to a vehicle body 101 by bolts 103. Therefore, the hollow shaft 4 is secured with respect to the vehicle body 101. In this embodiment, however, the hollow shaft 104 extends transversely with respect to the longitudinal axis of the vehicle body 101.

An arm 117 has on a distal end thereof a boss 119 having an axle insertion hole 118, and is curved from the boss 119 inwardly with respect to the vehicle body, i.e., toward the transverse center of the vehicle body, in a direction toward a housing 105 so as to be positioned out of physical interference with a wheel 120 with a tire mounted thereon. The arm 117 does not comprise a solid body, but has a a skeleton structure reinforced with stiffening ribs 121. Therefore, the arm 117 is relatively light in weight and mechanically strong. The axle insertion hole 118 has an axis extending parallel to the axis of a torsion bar 110, so that the torsion bar 110 will not be subject to vertical or fore-and-aft bending forces.

The housing 105 is integrally formed with the opposite proximal end of the arm 117. The housing 105 and the arm 117 are constructed as a unitary body by hot forging. However, the arm 117 and the housing 105 may be formed independently, and the housing 105 may be welded or bolted to the arm 117 subsequently.

As shown in FIG. 5, the housing 105 has a noncylindrical hole defined therein and having a sectorial cross-sectional shape which spreads rearwardly, i.e., toward the distal end of the arm 117. The opposite open ends of the noncylindrical hole are closed by end plates 106, 107, thus defining an oil chamber S10 in the housing 105. The oil chamber S10 is filled with working oil. The end plates 106, 107 are angularly movably supported on the hollow shaft 104 by respective bearings 108. The end plates 106, 107 and the housing 104 are fastened together by bolts 109 as shown in FIG. 4. Consequently, the housing 105 is angularly movable with respect to the hollow shaft 104, and hence the arm 117 is swingably mounted with respect to the vehicle body 101.

The torsion bar 110 extends through the hollow shaft 104 and has one end coupled to the vehicle body 101 and the other end projecting out of the hollow shaft 104. The projecting end of the torsion bar 110 is joined by serrations or splines to a bracket 111 that is integrally formed with one side of the end plate 106.

The oil chamber S10 is divided into two oil chambers S11, S12 by a vane 112 integrally joined to an outer peripheral surface of the hollow shaft 104, as shown in FIG. 5. Stopper rubber members 113 are mounted on the vane 112, and a valve 114 is detachably attached to the vane 112. The housing 105 also has a cylindrical hole defined therein rearwardly of the oil chamber S10. A slidably movable free piston 115 disposed in the cylindrical hole defines a temperature compensation gas chamber S13 and an oil chamber S14 communicating with the oil chamber S10 through a hole (not shown), with a valve 116 disposed in the oil chamber S14.

The outer peripheral surface of the hollow shaft 104 and the outer surface of the vane 112 are covered with a seal member 122 (FIG. 5). The valve 114 detachably mounted on the vane 112 includes a nut 121 and a flange 123 which clamp therebetween a step of an opening defined in the vane 112. The valve 114 also has oil passages 124, 126 defined in the vane 112 and valve plates 125, 127 mounted on the opposite sides of the vane 112.

Operation of the motor vehicle suspension shown in FIGS. 3 through 5 will be described below.

When the arm 117 swings from the position shown in FIG. 3 in the direction indicated by the arrow, the vane 112 moves in the oil chamber S10 upwardly with respect to the housing 105, the working oil is forced to flow from the oil chamber S11 through the oil passages 124 into the oil chamber S12 while pushing open the valve plate 125, thereby applying a damping force to the arm 117. When the arm 117 swings in the direction indicated by the arrow B, the working oil is forced to flow from the oil chamber S12 through the oil passages 126 into the oil chamber S11 while pushing open the valve plate 127, thereby dampening the swinging movement of the arm 117. With the arm 117 swinging in the direction indicated by the arrow A or B, the torsion bar 110 is resiliently twisted to dampen the swinging movement of the arm 117. A coil spring (not shown) may also be used in combination with the torsion bar 110 in order to increase the damping force.

With the present invention, as described above, the motor vehicle suspension is of a compact size in its entirety, allowing the passenger and engine compartments of the motor vehicle to be larger in size. Since the housing of the rotary damper is integrally joined to the arm, the proximal end of the arm is increased in rigidity. Therefore, the suspension has a sufficient degree of mechanical strength against forces applied vertically and laterally to the suspension. The swingable arm in the second embodiment is curved out of physical interference with the tire on the wheel, so that a tire housing which accommodates the tire is not required to project laterally out from the vehicle body.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

We claim:

1. A suspension for supporting a wheel on a vehicle body, comprising:
   a hollow shaft adapted to be fixed to the vehicle body;
   an arm having one end adapted to be coupled to the wheel and an opposite end pivotally supported on an outer peripheral surface of said hollow shaft;
   a rotary damper interposed between said hollow shaft and said arm, for dampening swinging movement of said arm with respect to said hollow shaft, said rotary damper comprising a damper case with an oil chamber defined therein and filled with working oil and a vane movably disposed in said oil chamber, said damper case being fixed to said opposite end of the said arm for angular movement in unison with said arm, said vane being joined to the outer peripheral surface of the hollow shaft; and
   a torsion bar extending through said hollow shaft and having one end adapted to be fixed to said vehicle body and an opposite end coupled to said opposite end of said arm for angular movement in unison with said arm.

2. A suspension according to claim 1, wherein said oil chamber is noncylindrical having a substantially sectorial cross-sectional shape.

3. A suspension according to claim 1, wherein said damper case has a temperature compensation chamber communicating with said oil chamber, for absorbing a temperature-dependent change in the volume of the working oil.

4. A suspension according to claim 1, wherein said arm comprises two arms joined to each other and swingably mounted on said hollow shaft, said damper case comprising a housing disposed between said two arms and ends of said two arms which close opposite sides of said housing.

5. A suspension according to claim 1, wherein said damper case comprises a housing integrally coupled to said opposite end of said arm and end plates angularly movably mounted on said hollow shaft and closing opposite sides of said housing, said opposite end of said torsion bar being joined to said end plates.

6. A suspension according to claim 5, wherein said one end of said arm has an axle insertion hole for supporting the wheel with a tire mounted thereon, said arm being curved toward the transverse center of the vehicle body in a direction toward said opposite end of said arm so as to be held out of physical interference with the tire.

7. A suspension according to claim 6, wherein said axle insertion hole has an axis extending parallel to the axis of said torsion bar.

* * * * *